United States Patent
Lee et al.

(10) Patent No.: US 9,941,807 B2
(45) Date of Patent: Apr. 10, 2018

(54) POWER CONVERSION APPARATUS AND AIR CONDITIONER INCLUDING THE SAME

(71) Applicant: LG ELECTRONICS INC., Seoul (KR)

(72) Inventors: Jongwan Lee, Seoul (KR); Eungho Kim, Seoul (KR); Gwigeun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/249,594

(22) Filed: Aug. 29, 2016

(65) Prior Publication Data
US 2017/0063248 A1    Mar. 2, 2017

(30) Foreign Application Priority Data
Aug. 27, 2015    (KR) .................. 10-2015-0121212

(51) Int. Cl.
| | |
|---|---|
| H02M 5/458 | (2006.01) |
| H02M 3/335 | (2006.01) |
| F24F 1/20 | (2011.01) |
| F24F 5/00 | (2006.01) |
| F24F 11/00 | (2018.01) |
| F25B 13/00 | (2006.01) |
| F25B 31/02 | (2006.01) |
| H02P 27/08 | (2006.01) |
| H02M 1/12 | (2006.01) |

(52) U.S. Cl.
CPC ............. *H02M 5/458* (2013.01); *F24F 1/20* (2013.01); *F24F 5/001* (2013.01); *F24F 11/006* (2013.01);
(Continued)

(58) Field of Classification Search
CPC .... F24F 11/006; F24F 1/20; F24F 2011/0068; F25B 2600/021; F25B 2700/151;
(Continued)

(56) References Cited

U.S. PATENT DOCUMENTS 4,559,594 A * 12/1985 Sears ................... A61N 1/10
                                                                  363/126
4,631,652 A * 12/1986 Wendt .................. H01F 27/38
                                                                  348/E5.127
(Continued)

FOREIGN PATENT DOCUMENTS

| EP | 2 800 263 | 11/2014 |
|---|---|---|
| JP | H02-097225 | 4/1990 |

(Continued)

OTHER PUBLICATIONS

European Search Report dated Jan. 20, 2017, issued in Application No. 16185601.8.
(Continued)

*Primary Examiner* — Bentsu Ro
*Assistant Examiner* — Thai Dinh
(74) *Attorney, Agent, or Firm* — KED & Associates, LLP

(57) ABSTRACT

A power conversion apparatus includes a rectifier to rectify a voltage of an input alternating current (AC) power source and a voltage drop device to output a dropped voltage using the voltage from the rectifier, and the voltage drop device includes a transformer and a communication voltage output device provided at a secondary side of the transformer to output a first direct current (DC) voltage for operation of a communication device. The communication voltage output device includes a first resistor provided at the secondary side of the transformer to reduce an output change rate of the first DC voltage and first and second zener diodes connected between the first resistor and ground to limit an upper limit of the first DC voltage. Accordingly, it is possible to stably supply a voltage to a communication unit while reducing standby power.

12 Claims, 10 Drawing Sheets

(52) U.S. Cl.
CPC .............. *F25B 13/00* (2013.01); *F25B 31/02* (2013.01); *H02M 3/335* (2013.01); *H02M 3/33561* (2013.01); *H02P 27/08* (2013.01); *F24F 2011/0063* (2013.01); *F24F 2011/0068* (2013.01); *F24F 2011/0075* (2013.01); *F25B 2700/151* (2013.01); *H02M 1/12* (2013.01)

(58) Field of Classification Search
CPC .......... F25B 31/02; F25B 49/00; H02P 6/085; H02M 3/335; H02M 3/33561; H02M 5/458
See application file for complete search history.

(56) References Cited

U.S. PATENT DOCUMENTS

| | | | | |
|---|---|---|---|---|
| 6,014,325 | A * | 1/2000 | Pecore | .................... F25D 29/00 323/908 |
| 6,153,993 | A * | 11/2000 | Oomura | .................... H02P 6/34 318/434 |
| 2005/0159924 | A1* | 7/2005 | Shah | .................. G05B 23/0264 702/183 |
| 2008/0225559 | A1* | 9/2008 | Yanada | ............. H02M 3/33507 363/44 |
| 2009/0251925 | A1 | 10/2009 | Usui et al. | |
| 2014/0028237 | A1* | 1/2014 | Park | ........................ H02P 27/06 318/504 |
| 2016/0241156 | A1* | 8/2016 | Kawakami | ............ H02M 7/003 |

FOREIGN PATENT DOCUMENTS

| | | |
|---|---|---|
| JP | 2003-037977 | 2/2003 |
| JP | 2013-141344 | 7/2013 |

OTHER PUBLICATIONS

Korean Office Action dated Sep. 22, 2016 issued in Application No. 10-2015-0121212.

* cited by examiner

POWER CONVERSION APPARATUS AND AIR CONDITIONER INCLUDING THE SAME

CROSS-REFERENCE TO RELATED APPLICATION(S)

This application claims the priority benefit of Korean Patent Application No. 10-2015-0121212, filed on Aug. 27, 2015 in the Korean Intellectual Property Office, the disclosure of which is incorporated herein by reference.

BACKGROUND

1. Field

A power conversion apparatus and an air conditioner including a power conversion apparatus, and more particularly a power conversion apparatus capable of stably supplying a voltage to a communication unit while reducing standby power, and an air conditioner including a power conversion apparatus is disclosed.

2. Background

An air conditioner may discharge cool or hot air into a room to adjust an indoor temperature and to purify indoor air, thereby providing a comfortable indoor environment to users. In general, the air conditioner may include an indoor unit or device installed in a room and an outdoor unit or device that supplies a refrigerant to the indoor unit. The indoor unit may include an indoor heat exchanger. The outdoor unit may include a compressor and an outdoor heat exchanger.

To facilitate communication between the indoor unit and the outdoor unit, a communication unit may be provided. Even when the air conditioner is not in operation, a voltage may be supplied to the communication unit, consuming standby power.

BRIEF DESCRIPTION OF THE DRAWINGS

The embodiments will be described in detail with reference to the following drawings in which like reference numerals refer to like elements wherein.

DETAILED DESCRIPTION

Figure 1:
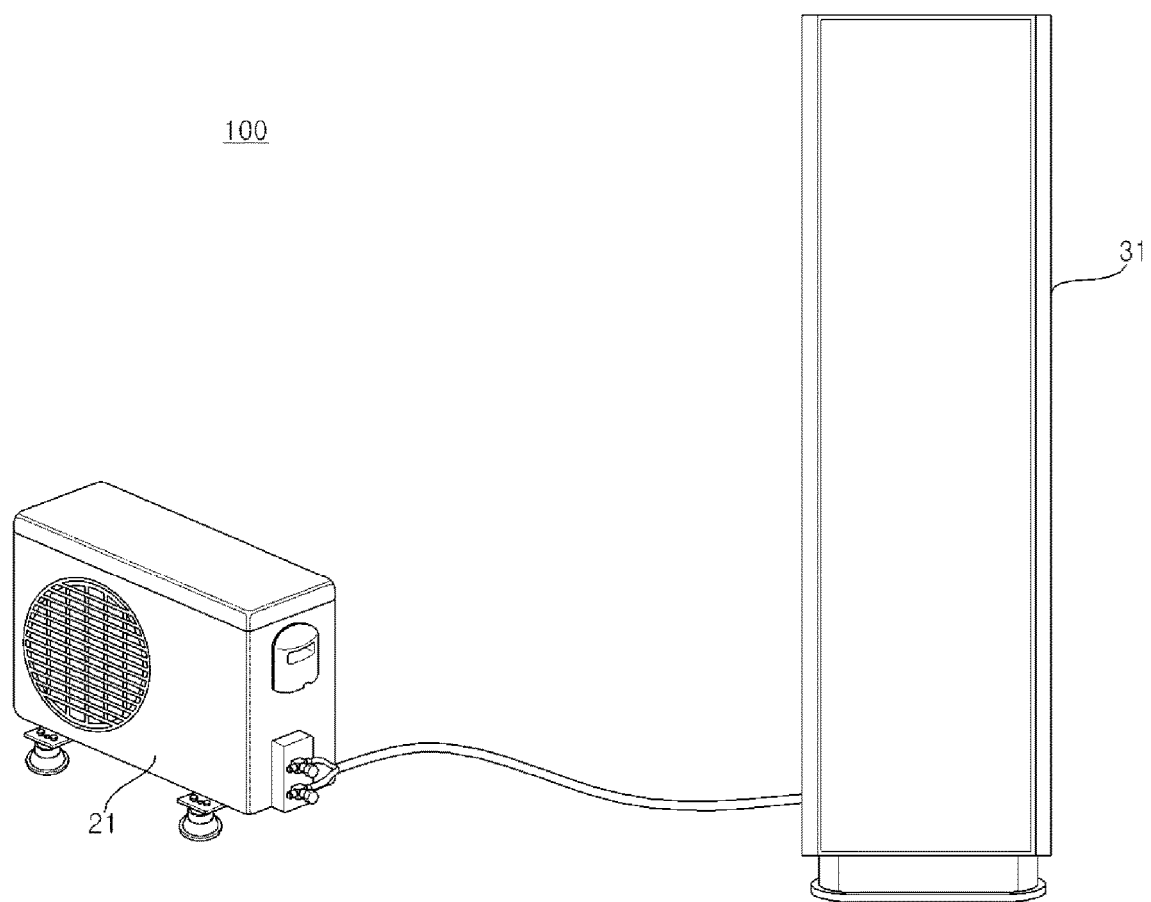
FIG. 1 is a diagram showing the construction of an air conditioner according to an embodiment.

As illustrated in FIG. 1, an air conditioner 100 according to an embodiment may include an indoor unit or device 31 and an outdoor unit or device 21 connected to the indoor unit 31. The indoor unit 31 of the air conditioner may be any one of stand type, wall mount type, and ceiling type air conditioners. In FIG. 1, the stand type indoor unit 31 is illustrated. The air conditioner 100 may further include at least one of a ventilator, an air purifier, a humidifier, and a heater, which may be operatively connected to the indoor unit and the outdoor unit.

The outdoor unit 21 may include a compressor to compress a refrigerant, an outdoor heat exchanger to perform heat exchange between the refrigerant and outdoor air, an accumulator to extract a gaseous refrigerant component from the refrigerant and supply the extracted gaseous refrigerant component to the compressor, and a four-way valve to change a flow path of the refrigerant based on a heating operation. In addition, while the outdoor unit 21 may further include a plurality of sensors, a valve, and an oil collector, descriptions thereof will be omitted herein.

The outdoor unit 21 may operate compressors and outdoor heat exchangers included in the outdoor unit 21 to compress the refrigerant or perform heat exchange based on setting conditions and to supply the compressed or heat-exchanged refrigerant to the indoor unit 31. The outdoor unit 21 may be driven according to an input from a remote control unit (or remote control) or the indoor unit 31. As a cooling/heating capacity of the air conditioner 100 varies based on the indoor unit which is driven, the number of driven outdoor units and the number of driven compressors installed in outdoor units may be changed.

The outdoor unit 21 may supply the compressed refrigerant to the connected indoor unit 31. The indoor unit 31 may receive the refrigerant from the outdoor unit 21 to discharge cool or hot air into a room. The indoor unit 31 may include an indoor heat exchanger, an indoor fan, an expansion valve to expand the refrigerant, and a plurality of sensors.

The outdoor unit 21 and the indoor unit 31 may be connected to each other via communication cables to exchange data with each other. The outdoor unit 21 and the indoor unit 31 may be connected to the remote control unit by wire or wirelessly to operate under control of the remote control unit.

A remote controller may be connected to the indoor unit 31 to allow a user to input a control command to control the indoor unit and to receive and display state information on the indoor unit. The remote controller may communicate with the indoor unit in a wired or wireless manner according to how the remote controller is connected to the indoor unit 31.

Figure 2:
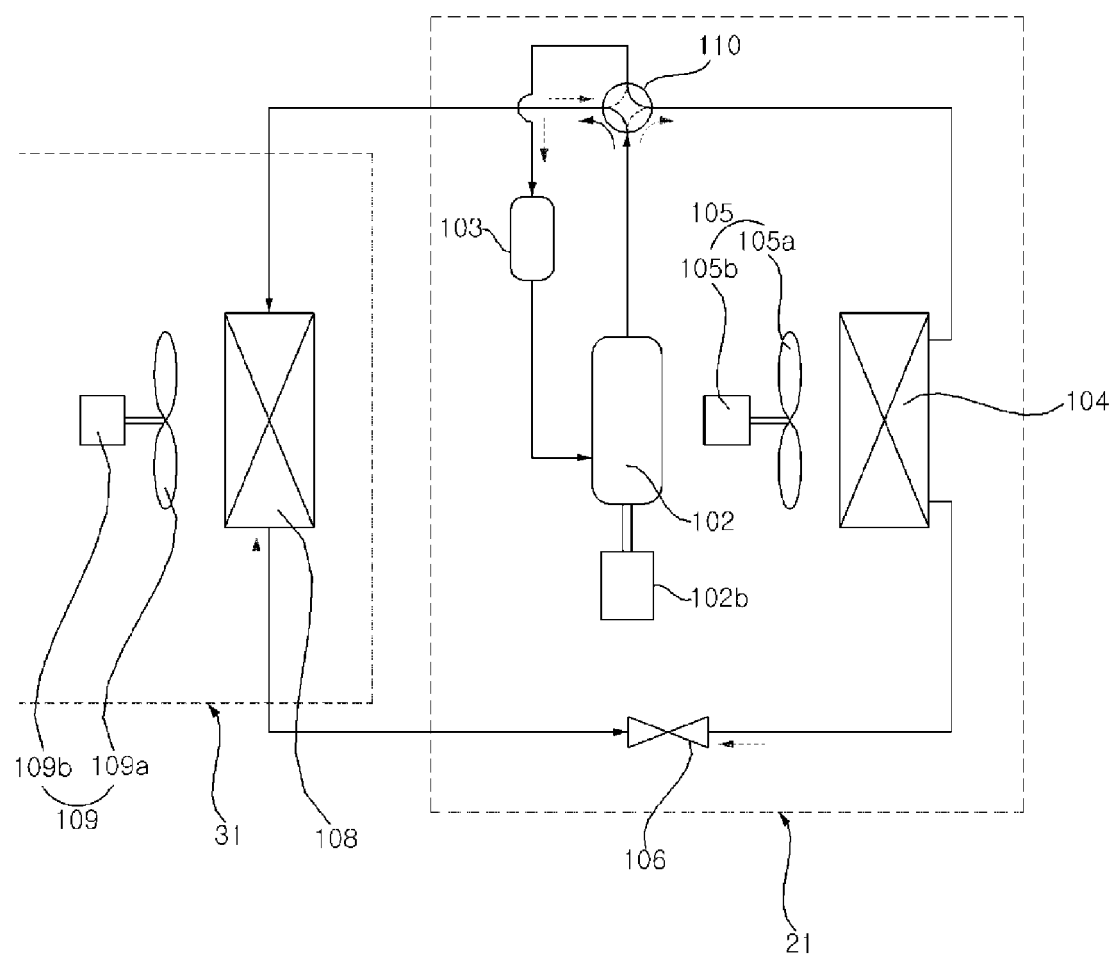
FIG. 2 is a schematic view showing an outdoor unit and an indoor unit of FIG. 1.

Referring to FIG. 2, the air conditioner 100 may be broadly divided into the indoor unit 31 and the outdoor unit 21. The outdoor unit 21 may include a compressor 102 that compresses a refrigerant, a compressor motor 102b that drives the compressor, an outdoor heat exchanger 104 that dissipates heat from the compressed refrigerant, an outdoor blower 105 including an outdoor fan 105a provided at one side of the outdoor heat exchanger 104 to accelerate heat dissipation of the refrigerant and a motor 105b that rotates the outdoor fan 105a, an expansion unit or device 106 that expands the condensed refrigerant, a cooling/heating switching valve 110 that changes a flow path of the compressed refrigerant, and an accumulator 103 that temporarily stores the gaseous refrigerant to remove moisture and foreign particles from the refrigerant and supplies the refrigerant of predetermined pressure to the compressor.

The indoor unit 31 may include an indoor heat exchanger 108 provided in a room to perform a cooling/heating function, and an indoor blower 109 including an indoor fan 109a provided at one side of the indoor heat exchanger 108 to accelerate heat dissipation of the refrigerant and an indoor fan motor 109b that rotates the indoor fan 109a. At least one indoor heat exchanger 108 may be provided. At least one of an inverter compressor and a constant speed compressor may be used as the compressor 102.

The air conditioner 100 may be a cooler to cool the room or may be a heat pump to cool or heat the room. The compressor 102 of the outdoor unit 21 of FIG. 1 may be driven by a power conversion apparatus (200 of FIG. 3) that drives the compressor motor 250.

Figure 3:
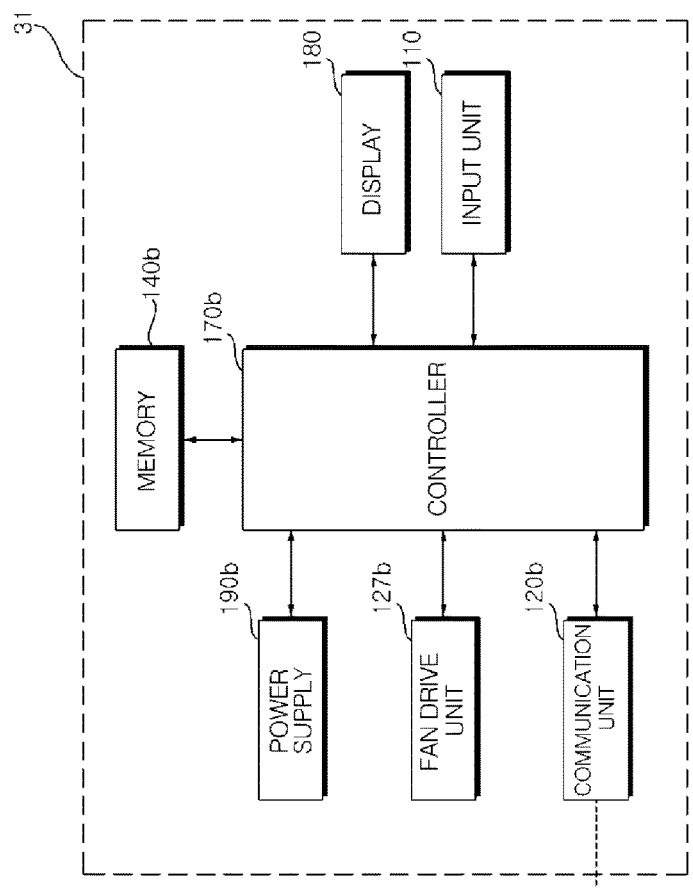
FIG. 3 is a block diagram showing the internal configuration of the outdoor unit and the indoor unit of the air conditioner of FIG. 1.
Figure 3:
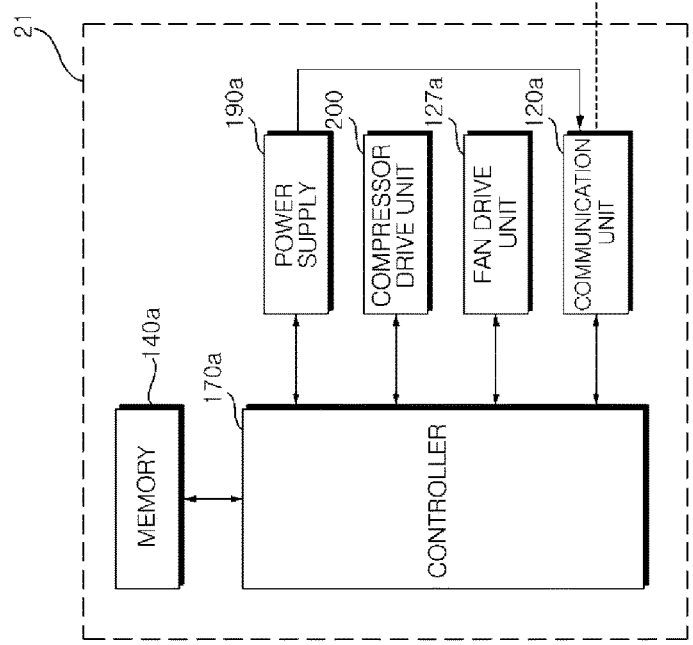

Referring to FIG. 3, the indoor unit 21 may include a communication unit 120a, a memory 140a, a controller 170a, a power supply 190a, a compressor drive unit 200 and a fan drive unit 127a. The communication unit 120a may exchange data with the indoor unit 31. For example, the communication unit may exchange data with the indoor unit via wired power-line communication.

The memory 140a may store a variety of data to operate the outdoor unit 21, such as a program to process or control the controller 170a. The controller 170a may control overall operation of each unit of the outdoor unit 21. The power supply 190a may supply a voltage necessary to operate each component under control of the controller 170a. The compressor drive unit 200 may include a circuit to drive the compressor. The fan drive unit 127a may include a circuit to drive a fan.

The indoor unit 31 may include an input unit (or input) 110, a memory 140b, a controller 170b, a display 180 and a power supply 190b. The input unit 110 may include a plurality of buttons or a touch screen attached to the indoor unit 31. Through the plurality of buttons or the touchscreen, the indoor unit 31 may be powered on. The input unit may perform various input operations.

The communication unit 120b may exchange data with the outdoor unit 21. The communication unit may exchange data with the outdoor unit 21 via wired power-line communication. The memory 140b may store a variety of data concerning overall operation of the indoor unit 31, such as a program to process or control the controller 170b.

The controller 170b may control overall operation of each unit or device of the indoor unit 31. The power supply 190b may supply a voltage necessary to operate each component under control of the controller 170b. The display 180 may display an operation state of the indoor unit 31.

Figure 4:
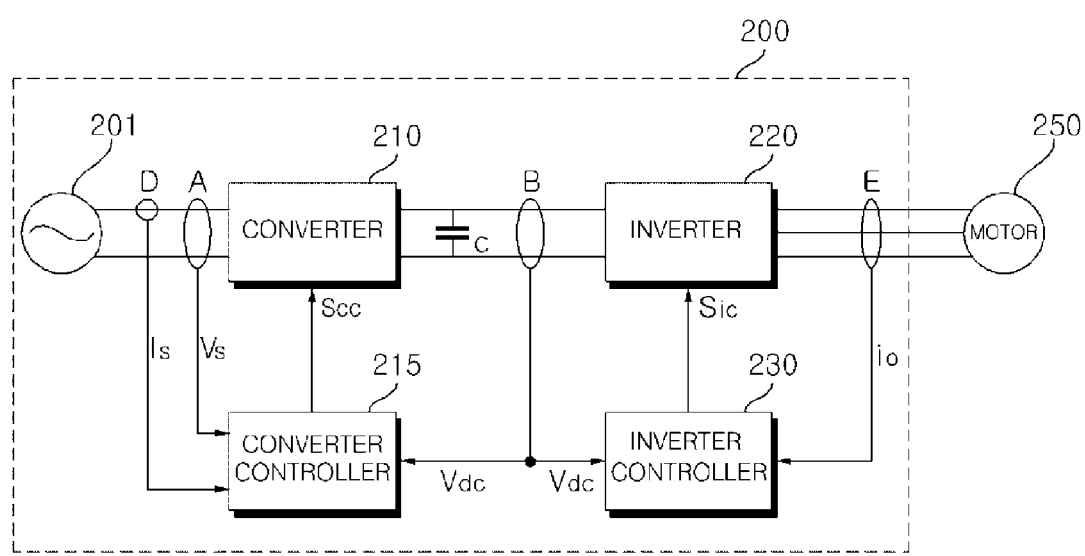
FIG. 4 is a block diagram showing a compressor drive unit to drive a compressor of the outdoor unit of FIG. 1.

Referring to FIG. 4, the compressor drive unit (200 of FIG. 4) that drives the compressor may include an inverter 220 that outputs three-phase AC current to a compressor motor 250, an inverter controller 230 that controls the inverter 220, a converter 210 that supplies a dc voltage to the inverter 220, a converter controller 215 that controls the converter 210, and a dc link capacitor C between the converter 210 and the inverter 220. The compressor drive unit 200 may further include a dc link voltage detector B, an input voltage detector A, an input current detector D and an output current detector E.

The compressor drive unit 200 may convert AC power received from a power system and supply the converted power to the compressor motor 250. The compressor drive unit 200 may be referred to as a compressor drive apparatus.

The compressor drive unit 200 may divide a half-period into a plurality of periods according to the level or phase of the input AC voltage and change the switching frequency of the switching element of the converter 210 in at least some of the plurality of periods. Accordingly, it may be possible to reduce switching and conduction loss of the switching element of the converter and, as a result, to increase converter efficiency.

Figure 5:
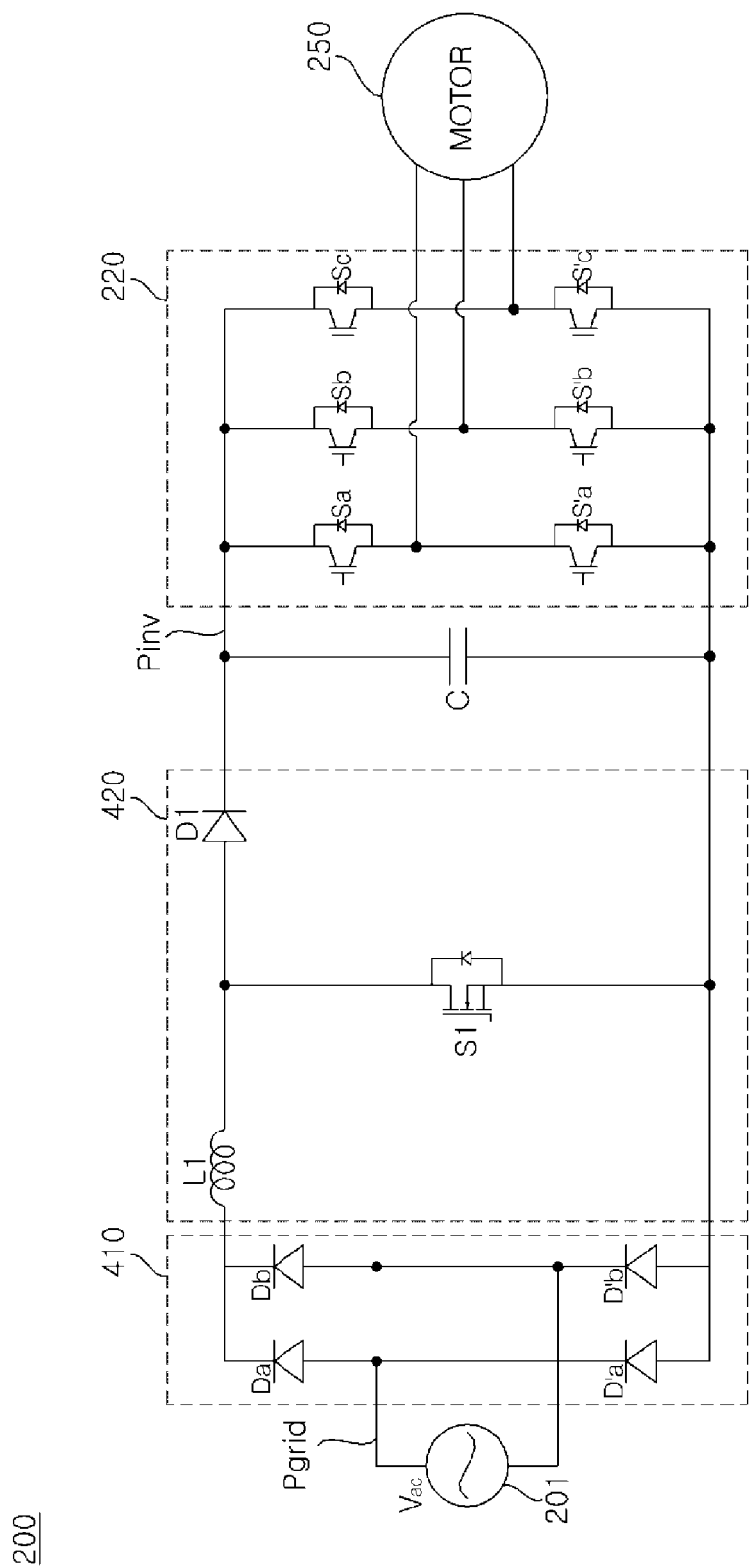
FIG. 5 is a circuit diagram showing an example of the compressor drive unit of FIG. 4.

Referring to FIG. 5, the converter 210 may convert an input AC voltage into a dc voltage. The converter 210 may include a rectifier 410 and a boost converter 420. Input power based on the input AC voltage may be referred to as Pgrid.

The rectifier 410 may receive and rectify a single-phase AC voltage 201 and output a rectified voltage. The rectifier 410 may include two pairs of upper and lower arm diodes which are connected to each other in parallel (Da&D'a, Db&D'b), each pair including an upper arm diode element and a lower arm diode element which are connected in series. The upper and lower arm diodes may be connected to each other in the form of a bridge.

The boost converter 420 may include an inductor L1 and a diode D1 connected in series between the rectifier 410 and the inverter 220 and a switching element S1 connected between the inductor L1 and the diode D1. The switching element S1 may be turned on to store energy in the inductor L1 and then turned off to output the energy stored in the inductor L1 through the diode D1. If a low-capacity dc link capacitor C is used, the boost converter 420 may output a voltage obtained by boosting a predetermined voltage, or an offset voltage.

The converter controller 215 may control turn-on timing of the switching element S1 of the boost converter 420. Accordingly, a converter switching control signal $S_{cc}$ that controls the turn-on timing of the switching element S1 may be output. The converter controller 215 may receive an input voltage $V_s$, input current $I_s$ and a dc link voltage $V_{dc}$ from the input voltage detector A, the input current detector D and the dc link voltage detector B, respectively.

The input voltage detector A may detect the input voltage $V_s$ from an input AC power source 201 and may be located at the previous stage of the rectifier 410. The input voltage detector A may include a resistor element and an operational amplifier (OP AMP) to detect voltage. The detected input voltage $V_s$ may be applied to the converter controller 215 in the form of a pulse type discrete signal to generate the converter switching control signal $S_{cc}$. The input voltage detector A may also detect a zero crossing point of the input voltage.

The input current detector D may detect input current $I_s$ from the input AC power source 201. Specifically, the input current detector D may be provided at the previous stage of the rectifier 410. The input current detector D may include a current sensor, a current transformer (CT), and a shunt resistor to detect current. The detected input current $I_s$ may be applied to the converter controller 215 in the form of a pulse type discrete signal to generate the converter switching control signal $S_{cc}$.

The dc voltage detector B may detect dc link voltage $V_{dc}$ of the dc link capacitor C. A resistor element, an OP AMP, etc. may be used to detect power. The detected voltage $V_{dc}$ of the dc link capacitor C may be applied to the converter controller 215 and the inverter controller 230 in the form of a pulse type discrete signal. The converter switching control signal $S_{cc}$ and an inverter switching control signal $S_{ic}$ may be generated based on the dc voltage $V_{dc}$ of the dc link capacitor C.

The inverter 220 may include a plurality of inverter switching elements. The inverter 220 may convert the dc voltage $V_{dc}$ smoothed by on/off operations of the switching elements into a three-phase AC voltage having a predetermined frequency and output the three-phase AC voltage to the three-phase motor 250.

The inverter 220 may then supply an inverter power Pinv to the motor 250 as a load. The inverter power Pinv is a power load necessary for the motor 250. The inverter power may follow a necessary target power. The inverter power Pinv may have the same concept as a target power required for the load.

The inverter 220 may include a plurality of switching elements. The inverter 220 may include upper arm switching elements Sa, Sb, and Sc and lower arm switching elements S'a, S'b, and S'c, each pair of an upper arm switching element and a lower arm switching element being connected in series and three pairs of upper and lower arm switching elements Sa and S'a, Sb and S'b, and Sc and S'c being connected in parallel. Diodes may be connected in anti-parallel to the respective switching elements Sa, S'a, Sb, S'b, Sc, and S'c.

The inverter controller 230 may output the inverter switching control signal $S_{ic}$ to the inverter 220 to control a switching operation of the inverter 220. The inverter switching control signal $S_{ic}$ may be generated and output based on an output current $i_o$ flowing in the motor 250, and the dc link voltage $V_{dc}$ at both ends of the dc link capacitor, as a pulse width modulation (PWM) switching control signal. The output current $i_o$ may be detected by the output current detector E and the dc link voltage $V_{dc}$ may be detected by the dc link voltage detector B.

The output current detector E may detect the output current $i_o$ flowing between the inverter 220 and the motor 250. The output current detector E may detect current flowing in the motor 250. The output current detector E may detect all output currents $i_a$, $i_b$, and $i_c$ of respective phases. Alternatively, the output current detector E may detect output currents of two phases using three-phase balance.

The output current detector E may be provided between the inverter 220 and the motor 250. A current transformer (CT), a shunt resistor, etc. may be used to detect current.

The output inverter switching control signal $S_{ic}$ may be converted into a gate drive signal in a gate drive unit and input to the gate of each switching element of the inverter 220. Therefore, the switching elements Sa, S'a, Sb, S'b, Sc and S'c of the inverter 220 may perform a switching operation.

Figure 6:
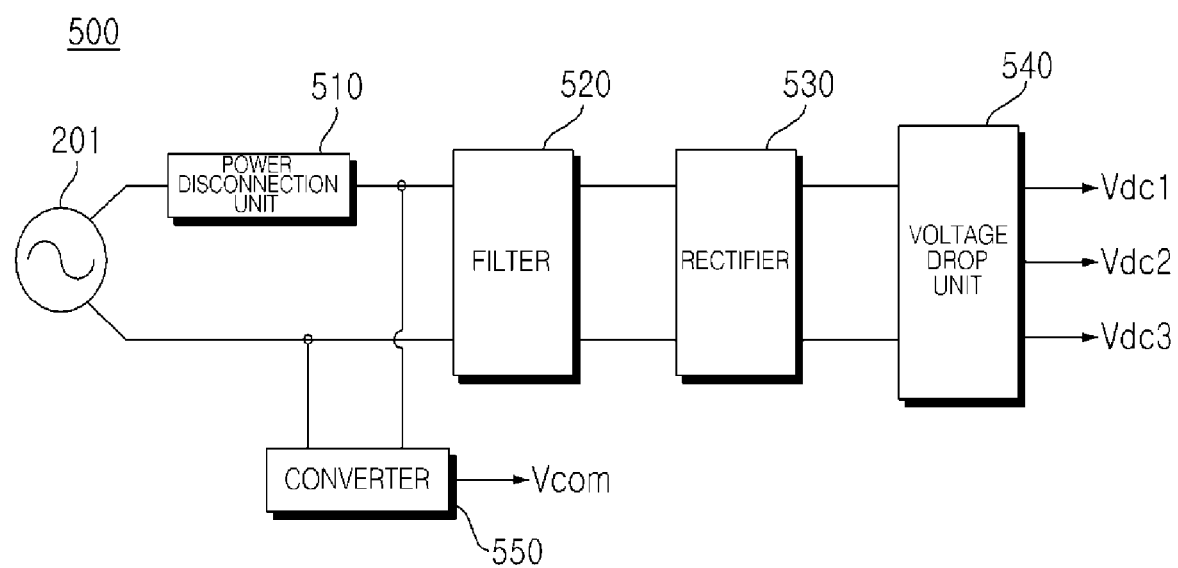
FIG. 6 is a block diagram showing the internal configuration of a power conversion apparatus of an air conditioner.

Referring to FIG. 6, the power conversion apparatus 500 may include a power disconnection unit or module 510, a filter 520, a rectifier 530, a voltage drop unit 540 and a converter 550 to output a voltage $V_{com}$ to an outdoor communication unit 120a. The converter 550 may be connected between the power disconnection unit 510 and the filter 520 to convert an AC voltage into a DC voltage and output the converted DC voltage as the voltage $V_{com}$ to the outdoor communication unit 120a.

When operation of the air conditioner 100 is stopped, according to the circuit configuration shown in FIG. 6, since voltage conversion is performed in the converter 550, power consumption may occurs in the form of standby power consumption. Even when the outdoor unit 210 does not operate and thus the voltage drop unit 540 does not operate, standby power consumption may occur in the converter 550.

Figure 7:
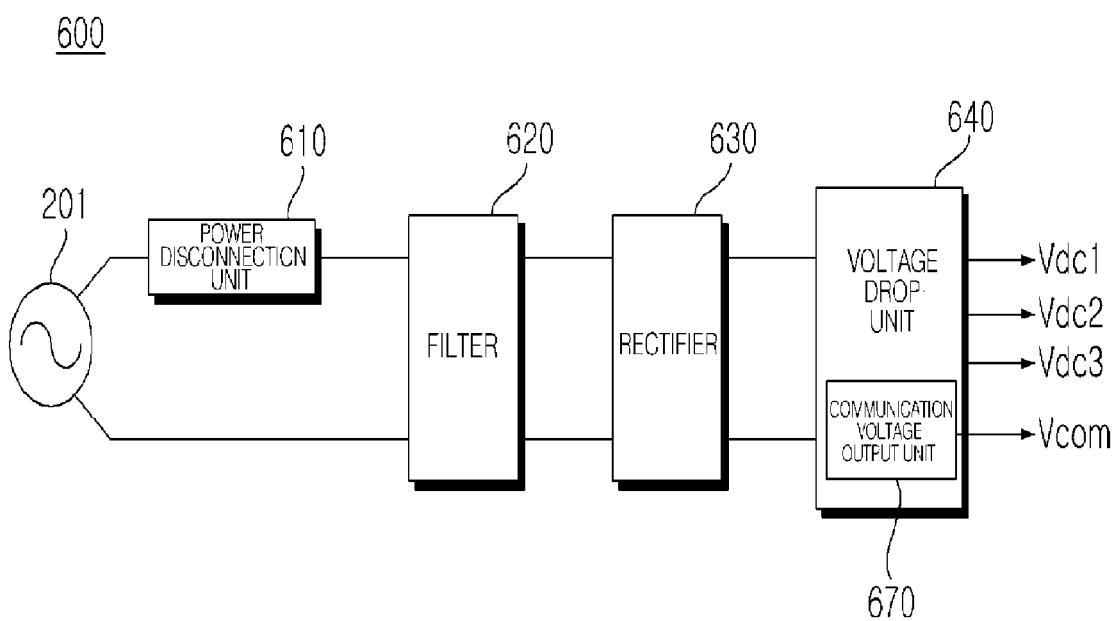
FIG. 7 is a block diagram showing the internal configuration of a power conversion apparatus of an air conditioner.

A method of stably outputting the voltage $V_{com}$ to the outdoor communication unit 120a while reducing unnecessary standby power consumption may be considered with reference to FIG. 7 and subsequent figures. Referring to FIG. 7, the power conversion apparatus 600 may be provided in the power supply 190a of FIG. 3.

The power conversion apparatus 600 may include a power disconnection unit or module 610, a filter 620, a rectifier 630 and a voltage drop unit or module 640. In particular, a communication voltage output unit or module 670 may be provided in the voltage drop unit 640.

The power disconnection unit 610 may perform a power connection operation of the input AC power source 201 and may include a fuse, for example. The filter 620 may eliminate noise of the input AC power source 201.

Figure 8:
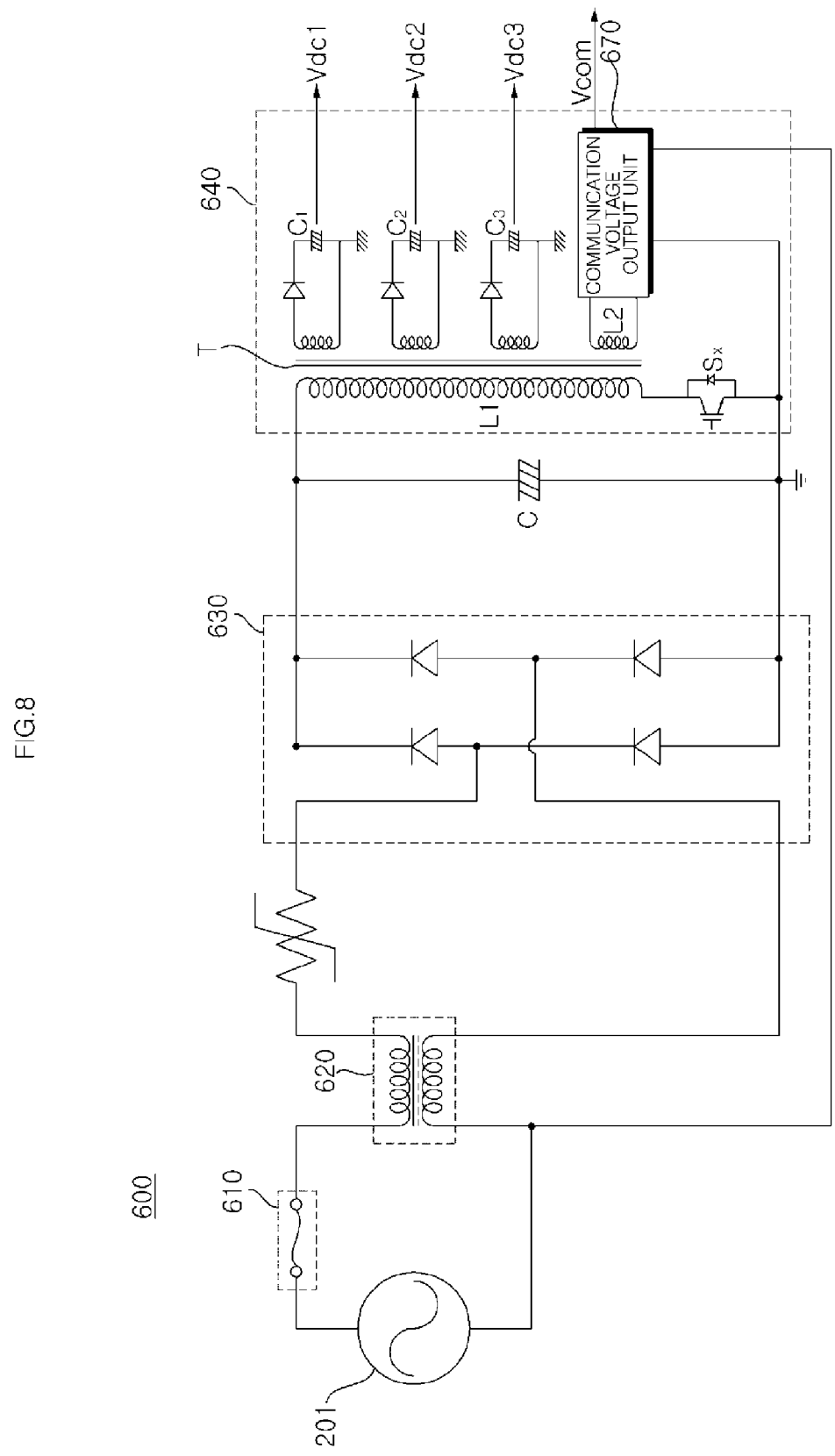
FIG. 8 is a circuit diagram of the power conversion apparatus of FIG. 7.

The rectifier 630 may rectify the voltage from the input AC power source 201 and output the rectified voltage. The rectifier 630 may include a bridge diode. As shown in FIG. 8, two upper diodes and two lower diodes may be connected in the form of a bridge.

A capacitor C for smoothing the rectified voltage may be provided between the rectifier 630 and the voltage drop unit 640. The voltage drop unit 640 may output the dropped voltage using the voltage from the rectifier. In particular, a plurality of DC voltages $V_{dc1}$, $V_{dc2}$, $V_{dc3}$ and $V_{com}$ may be output.

The plurality of DC voltages $V_{dc1}$, $V_{dc2}$, $V_{dc3}$ and $V_{com}$ may be supplied to the respective units of the outdoor unit 21. The voltage drop unit 640 may output the first DC voltage $V_{com}$ which is a communication voltage to the outdoor communication unit 120a. The voltage drop unit 640 may include a communication voltage output unit or module 670 to output the first voltage $V_{com}$ to the outdoor communication unit 120a. The voltage drop unit 640 may include a transformer T and a flyback converter including a switching element $S_x$ connected to the primary side of the transformer T. The communication voltage output unit 670 may be provided at the secondary side of the transformer T.

The power conversation apparatus 600 of FIG. 7 or 8 may further include the inverter 220 and the motor 250 described in FIG. 4, which may be provided between the rectifier 630 and the voltage drop unit 640. The inverter controller 230 described in FIG. 4 may be further included. The power conversion apparatus 600 may further include an inverter 220 connected across the capacitor C and connected to the voltage drop unit 640 in parallel.

The power conversion apparatus 600 may further include a dc link voltage detector B to detect a voltage across the capacitor C, an output current detector E to detect current flowing between the motor and the inverter 220, and an inverter controller 230 to control the inverter 220 based on the dc link voltage or output current, to control the inverter 220. The motor may be a compressor motor or an outdoor fan motor.

Figure 9:
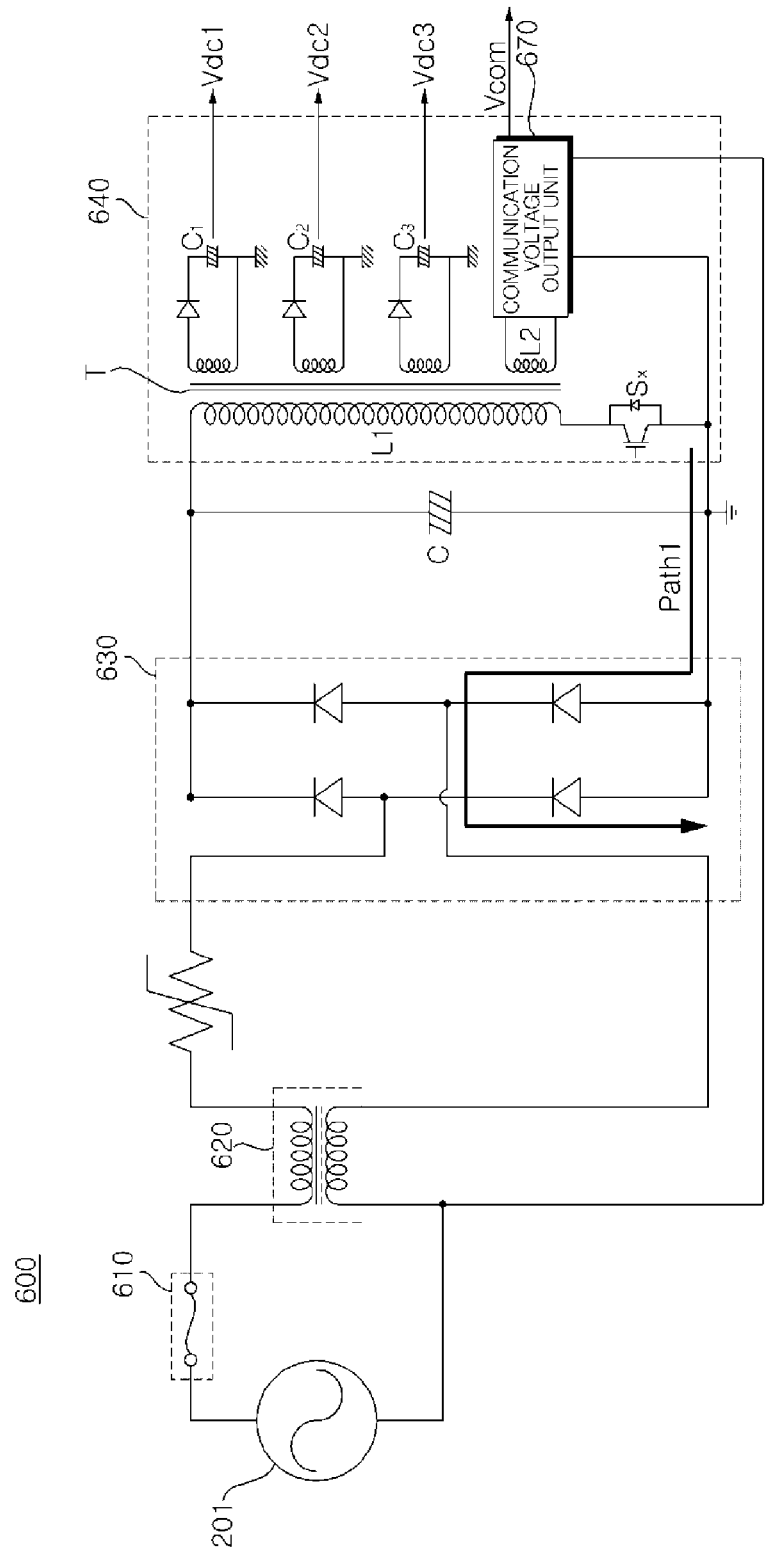
FIG. 9 is a diagram illustrating operation of the power conversion apparatus of FIG. 8.

Referring to FIG. 9, a first capacitor $C_x$ may store a first DC voltage $V_{com}$ by operation of the transformer T. When the lower diode of the rectifier 630 is conducted, the communication voltage output unit 670 may output the first DC voltage $V_{com}$ as the voltage $V_{com}$ to the outdoor communication unit 120a.

The first DC voltage $V_{com}$ may then be output as an independent power source separately from operation of the voltage drop unit 640, or more particularly, the transformer T. Accordingly, noise generated by the voltage drop unit 640 may be eliminated.

Since the communication voltage output unit 670 is provided at the secondary side of the transformer T, when the transformer T does not operate, or when the switching element $S_x$ does not operate, the communication voltage output unit 670 cannot output a voltage. Accordingly, standby power consumption may not occur.

When the outdoor unit operates and the switching element $S_x$ is turned on, the first DC voltage $V_{com}$ may be generated and, when the lower diode of the rectifier 630 is conducted, the first DC voltage $V_{com}$ may be output from the communication voltage output unit 670. According to the power conversion apparatus 600 of FIG. 7 or 8, it may be possible to stably supply the voltage to the communication unit while reducing standby power.

Figure 10:
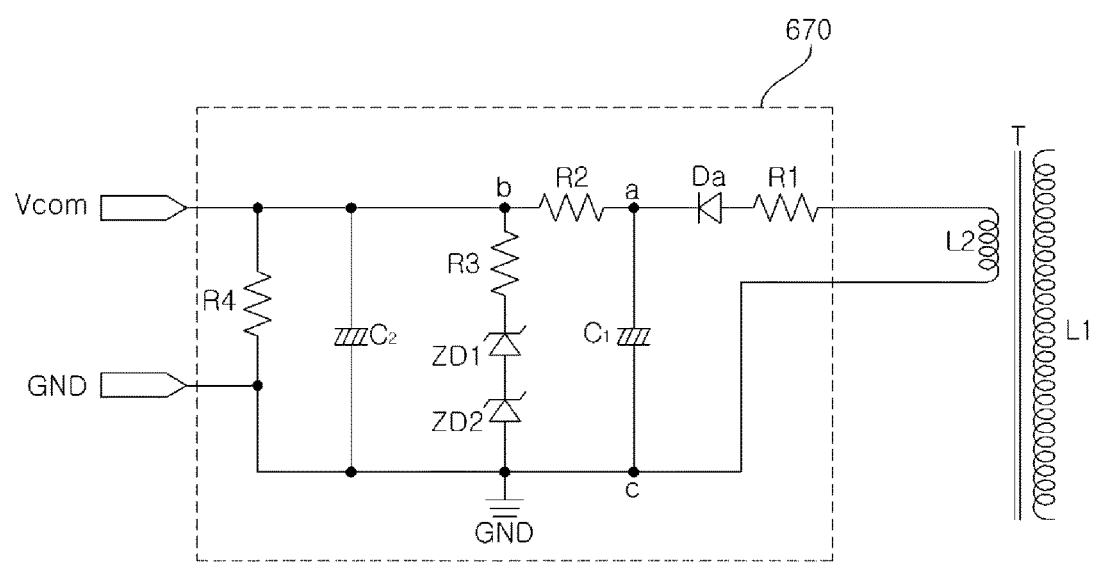
FIG. 10 is an internal circuit diagram of a communication voltage output unit of FIG. 7.

Referring to FIG. 10, the communication voltage output unit 670 may include a first resistor R1 provided at the secondary side of the transformer T to reduce an output change rate of the first DC voltage $V_{com}$ and first and second zener diodes ZD1 and ZD2 connected between the first resistor R1 and ground GND to limit an upper limit of the first DC voltage $V_{com}$. The communication voltage output unit 670 may further include a second resistor R2 and a third resistor R3 provided between the first resistor R1 and the first and second zener diodes ZD1 and ZD2 and connected in parallel.

The communication voltage output unit 670 may further include a first capacitor $C_1$ and a second capacitor $C_2$ connected to the first and second zener diodes ZD1 and ZD2 in parallel. The output change rate of the first DC voltage $V_{com}$ output from the secondary side of the transformer T may be reduced by the first resistor R1 and may be supplied to a node a through a diode Da. The first DC voltage $V_{com}$ may be stored in the first capacitor $C_1$ provided between the node a and a node c.

The second resistor R2 may be provided between the node a and a node b, and the second resistor R2 may limit current of the first and second zener diodes ZD1 and ZD2, thereby preventing damage of the first and second zener diodes ZD1 and ZD2. The third resistor R3 and the first and second zener diodes ZD1 and ZD2 may be sequentially provided between the node b and the node c (ground). The third resistor R3 may limit current of the first and second zener diodes ZD1 and ZD2, thereby preventing damage of the first and second zener diodes ZD1 and ZD2.

The second capacitor $C_2$ may be provided between the node b and the node c (ground) and connected to the first and second zener diodes ZD1 and ZD2 in parallel. The second capacitor $C_2$ may store the first current voltage $V_{com}$. The first DC voltage $V_{com}$ stored in the second capacitor $C_2$ may be output through an output terminal. The third resistor R3 may be provided between the node b and the node c (ground) and connected to the second capacitor $C_2$ in parallel.

Referring to FIGS. 8 to 10, the first capacitor $C_1$ may store the first DC voltage $V_{com}$ by operation of the transformer T and, when the lower diode of the rectifier 630 is conducted, the first DC voltage $V_{com}$ stored in the first capacitor $C_1$ may be stored in the second capacitor $C_2$. The communication voltage output unit 670 may output the first DC voltage $V_{com}$ stored in the second capacitor $C_2$ as the voltage $V_{com}$ to the outdoor communication unit 120a.

The first DC voltage $V_{com}$ stored in the second capacitor $C_2$ may be output as an independent power source separately from operation of the voltage drop unit 640, more particularly, the transformer T. Accordingly, noise generated by the voltage drop unit 640 may be eliminated.

Since the communication voltage output unit 670 is provided at the secondary side of the transformer T, when the transformer T does not operate, that is, when the switching element $S_x$ does not operate, the communication voltage output unit 670 cannot output a voltage. Accordingly, standby power consumption may not occur.

When the outdoor unit turns the switching element $S_x$ on, the first capacitor $C_1$ may store the first DC voltage $V_{com}$ by operation of the transformer T, and when the lower diode of the rectifier 630 is conducted, the first DC voltage $V_{com}$ stored in the first capacitor $C_1$ may be stored in the second capacitor $C_2$. According to the power conversion apparatus 600 of FIG. 7 or 8 and the communication voltage output unit 670 of FIG. 10, it may be possible to stably supply the voltage to the communication unit while standby power is reduced.

A power conversion apparatus may include a rectifier to rectify a voltage of an input alternating current (AC) power source and a voltage drop unit to output a dropped voltage using the voltage from the rectifier, and the voltage drop unit may include a transformer and a communication voltage output unit provided at a secondary side of the transformer to output a first direct current (DC) voltage for operation of a communication unit. The communication voltage output unit may include a first resistor provided at the secondary side of the transformer to reduce an output change rate of the first DC voltage and first and second zener diodes connected between the first resistor and ground to limit an upper limit of the first DC voltage. Accordingly, it may be possible to stably supply a voltage to a communication unit while reducing standby power.

The first DC voltage may be stored by operation of the transformer, and the first DC voltage from the communication voltage output unit may be output as an independent power source separately from the voltage drop unit. Accordingly, noise generated by the voltage drop unit may be eliminated.

The method of operating the power conversion apparatus or the air conditioner according to the present invention may be implemented as code that can be written to a processor-readable recording medium and can thus be read by a processor. The processor-readable recording medium may be any type of recording device in which data can be stored in a processor-readable manner. Examples of the processor-readable recording medium include a ROM, a RAM, a CD-ROM, a magnetic tape, a floppy disk, optical data storage, and a carrier wave (e.g., data transmission over the Internet). The computer-readable recording medium may be distributed over a plurality of computer systems connected to a network so that processor-readable code is written thereto and executed therefrom in a decentralized manner. Functional programs, code, and code segments to realize the embodiments herein can be construed by one of ordinary skill in the art.

A power conversion apparatus may include a rectifier to rectify a voltage of an input alternating current (AC) power source and a voltage drop unit to output a dropped voltage using the voltage from the rectifier, wherein the voltage drop unit includes a transformer and a communication voltage output unit provided at a secondary side of the transformer to output a first direct current (DC) voltage for operation of a communication unit, and wherein the communication voltage output unit includes a first resistor provided at the secondary side of the transformer to reduce an output change rate of the first DC voltage and first and second zener diodes connected between the first resistor and ground to limit an upper limit of the first DC voltage.

An air conditioner may include a compressor, a compressor drive unit to drive the compressor, a communication unit to exchange data with an indoor unit, a rectifier to rectify a voltage of an input alternating current (AC) power source, and a voltage drop unit to output a dropped voltage using the voltage from the rectifier, wherein the voltage drop unit includes a transformer and a communication voltage output unit provided at a secondary side of the transformer to output a first direct current (DC) voltage for operation of a communication unit, and wherein the communication voltage output unit includes a first resistor provided at the secondary side of the transformer to reduce an output change rate of the first DC voltage and first and second zener diodes connected between the first resistor and ground to limit an upper limit of the first DC voltage.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power conversion apparatus comprising:
   a rectifier to rectify a voltage of an input alternating current (AC) power source; and
   a voltage drop module to output a dropped voltage using the voltage from the rectifier, wherein the voltage drop module includes:
      a transformer having a primary side and a secondary side; and
      a communication voltage output module provided at the secondary side of the transformer to output a first direct current (DC) voltage to operate a communication module, wherein the communication voltage output module includes:
         a first resistor provided at the secondary side of the transformer to reduce an output change rate of the first DC voltage;
         first and second zener diodes connected between the first resistor and the ground to limit an upper limit of the first DC voltage; and
         second and third resistors provided between the first resistor and the first and second zener diodes and connected in parallel.

2. The power conversion apparatus according to claim 1, wherein the communication voltage output module further includes first and second capacitors connected to the first and second zener diodes in parallel.

3. The power conversion apparatus according to claim 1, further including:
   a power disconnection module to perform a power disconnection operation between the input AC power source and the readier; and
   a capacitor provided between the rectifier and the voltage drop module.

4. The power conversion apparatus according to claim 1, wherein the voltage drop module includes a flyback converter including the transformer and switching element connected to the primary side of the transformer.

5. The power conversion apparatus according to claim 1, further including:
   a capacitor provided between the rectifier and the voltage drop module.

6. The power conversion apparatus according to claim 5, further including:
   a dc link voltage detector to detect a voltage across the capacitor;
   an output current detector to detect output current flowing between the motor and the inverter; and
   an inverter controller to control the inverter based on the output current.

7. An air conditioner comprising:
   a compressor;
   a compressor driver to drive the compressor;
   a communication module to exchange data with an indoor device;
   a rectifier to rectify a voltage of an input alternating current (AC) power source; and
   a voltage drop module to output a dropped voltage using the voltage from the rectifier, wherein the voltage drop module includes:
      a transformer having a primary side and a secondary side; and
      a communication voltage output module provided at the secondary side of the transformer to output a first direct current (DC) voltage to operate the communication module, and wherein the communication voltage output module includes:
         a first resistor provided at the secondary side, of the transformer to reduce an output change rate of the first DC voltage; and
         first and second zener diodes connected between the first resistor and the ground to limit an upper limit of the first DC voltage; and
         second and third resistors provided between the first resistor and the first and second zener diodes and connected in parallel.

8. The air conditioner according to claim 7, wherein the communication voltage output module further, includes first and second capacitors connected to the first and second zener diodes in parallel.

9. The air conditioner according to claim 7, further including:
   a power disconnection module unit to perform a power disconnection operation between the input AC power source and the rectifier; and
   a capacitor provided between the rectifier and the voltage drop module.

10. The air conditioner according to claim 7, wherein the voltage drop module includes a flyback converter including the transformer and a switching element connected to the primary side of the transformer.

11. The air conditioner according to claim 7, further including:
   a capacitor provided between the rectifier and the voltage drop module; and
   an inverter connected across the capacitor and connected to the voltage drop module in parallel to drive a motor.

12. The air conditioner according to claim 11, further including:
   a dc link voltage detector to detect a voltage across the capacitor;
   an output current detector to detect output current flowing between the motor and the inverter; and
   an inverter controller to control the inverter based on the output current.

* * * * *